(12) United States Patent
Ren et al.

(10) Patent No.: US 12,520,266 B2
(45) Date of Patent: Jan. 6, 2026

(54) COLLISION PROCESSING AND INDICATION METHOD, DEVICE, APPARATUS, AND MEDIUM

(71) Applicant: DATANG MOBILE COMMUNICATIONS EQUIPMENT CO., LTD., Beijing (CN)

(72) Inventors: Bin Ren, Beijing (CN); Xiaotao Ren, Beijing (CN); Ren Da, Beijing (CN); Hui Li, Beijing (CN); Gang Li, Beijing (CN); Zheng Zhao, Beijing (CN); Zhenyu Zhang, Beijing (CN); Rongyi Fang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 469 days.

(21) Appl. No.: 17/924,674

(22) PCT Filed: Apr. 14, 2021

(86) PCT No.: PCT/CN2021/087199
§ 371 (c)(1),
(2) Date: Nov. 10, 2022

(87) PCT Pub. No.: WO2021/227754
PCT Pub. Date: Nov. 18, 2021

(65) Prior Publication Data
US 2023/0199696 A1 Jun. 22, 2023

(30) Foreign Application Priority Data
May 12, 2020 (CN) .......................... 202010397426.0

(51) Int. Cl.
*H04W 64/00* (2009.01)
*H04W 74/0808* (2024.01)

(52) U.S. Cl.
CPC ....... *H04W 64/00* (2013.01); *H04W 74/0825* (2013.01)

(58) Field of Classification Search
CPC ........................ G01S 5/0036; H04W 74/0825
(Continued)

(56) References Cited

U.S. PATENT DOCUMENTS

| 10,080,098 B1 | 9/2018 | Edge | |
| 2017/0289831 A1* | 10/2017 | Park | ........................ G01S 5/02 |
| 2017/0311126 A1* | 10/2017 | Lu | .............................. G01S 5/14 |
| 2019/0053280 A1 | 2/2019 | Rico Alvarino et al. | |
| 2020/0154449 A1 | 5/2020 | Akkarakaran et al. | |
| 2020/0396039 A1* | 12/2020 | Baldemair | ............ H04L 1/1812 |

(Continued)

FOREIGN PATENT DOCUMENTS

| CN | 110719148 A | 1/2020 |
| CN | 110999474 A | 4/2020 |

(Continued)

OTHER PUBLICATIONS

"Outcome of email thread [100e-NR-Pos-ULRS-02]," 3GPP TSG-RAN WG1 Meeting #100-e, R1-2001287, Agenda Item: 7.2.8.2, Source: Ericsson, Online, Feb. 24-Mar. 6, 2020, all pages.

(Continued)

*Primary Examiner* — Fabricio R Murillo Garcia
(74) *Attorney, Agent, or Firm* — Ladas & Parry, LLP (57) ABSTRACT

A collision processing method, indication method, device, apparatus and medium are disclosed. The collision processing method includes: obtaining, by user equipment, a downlink positioning reference signal (PRS) type and collision determination information, the collision determination information being one of or a combination of following information: content carried by a downlink signal/channel, first indication information, second indication information, and third indication information; wherein the downlink PRS type is aperiodic PRS or semi-persistent PRS, the first indication information is used for indicating a positioning latency requirement, the second indication information is (Continued)

used for indicating priority levels of the downlink signals/channels, and the third indication information is used for indicating priority levels of the first and second indication information; and choosing, according to the downlink PRS type and collision determination information, to discard either a downlink PRS or other downlink signals/channels in an orthogonal frequency division multiplexing symbol where a collision occurs.

13 Claims, 2 Drawing Sheets

(58) Field of Classification Search
USPC ...................................................... 445/456.1
See application file for complete search history.

(56) References Cited

U.S. PATENT DOCUMENTS

| | | | |
|---|---|---|---|
| 2021/0160022 A1 | 5/2021 | Cha et al. | |
| 2022/0209927 A1* | 6/2022 | Shreevastav | H04L 5/0051 |
| 2022/0369187 A1* | 11/2022 | Ganesan | H04W 74/0816 |
| 2025/0071773 A1* | 2/2025 | Iyer | H04W 72/23 |

FOREIGN PATENT DOCUMENTS

| | | |
|---|---|---|
| CN | 112970315 A | 6/2021 |
| GB | 201812678 | 9/2018 |
| GB | 2576045 A | 2/2020 |
| WO | 2019203526 A1 | 10/2019 |
| WO | 2020102191 A1 | 5/2020 |

OTHER PUBLICATIONS

"Feature Lead Summary #2 on AI 7.2.10.1—DL Reference Signals for NR Positioning," R1-1913473, 3GPP TSG RAN WG1 Meeting #99, Reno, US, Nov. 18-22, 2019, Source: Intel Corporation, Agenda item: 7.2.10.1, all pages.

First Office Action and search report for the corresponding Chinese Patent Application No. 202010397426.0 issued May 23, 2023 by the Chinese Patent Office.

International Search Report for International Application No. PCT/CN2021/087199 issued on Jul. 5, 2021 and its English Translation provided by WIPO.

Written Opinion for International Application No. PCT/CN2021/087199 issued on Jul. 5, 2021 and its English Translation provided by WIPO.

International Preliminary Report on Patentability for PCT/CN2021/087199 issued Nov. 15, 2022 and its English translation provided by WIPO.

"UL Reference Signals for NR Positioning," 3GPP TSG RAN WG1 #99, R1-1912491, Reno, USA, Nov. 18-22, 2019, Agenda item: 7.2.10.2, Source: Samsung, all pages.

"Remaining Details on UL Reference Signals for NR Positioning," 3GPP TSG RAN WG1 #98, R1-1912974, Chongqing, China, Oct. 14-18, 2019, Agenda item: 7.2.10.2, Source: Qualcomm Incorporated, all pages.

Extended European Search Report for the corresponding European Patent Application No. 21804792.6 issued by the European Patent Office on Oct. 9, 2023.

"UL Reference Signals for NR Positioning," 3GPP TSG RAN WG1 #98, R1-1909279, Prague, Czech Republic, 26-30, 2019, Agenda Item: 7.2.10.2, Source: Qualcomm Incorporated.

"Remaining Details on UL Reference Signals for NR Positioning," 3GPP TSG RAN WG1 #98, R1-1912974, Chongqing, China, Oct. 14-18, 2019, Agenda Item: 7.2.10.2, Source: Qualcomm Incorporated.

"Discussions on UL SRS for positioning collision rules," 3GPP TSG RAN WG1 #100, R1-2000761, e-Meeting, Feb. 24-Mar. 6, 2020, Agenda Item: 7.2.8.2, Source: CMCC.

"Maintenance of Rel-16 UL reference signals for NR positioning," 3GPP TSG-RAN WG1 Meeting #100b-e, R1-2002621, e-Meeting, Apr. 20-Apr. 20, 2020, Agenda Item: 7.2.8.2, Source: Ericsson.

* cited by examiner

101 — obtaining, by user equipment, a DL PRS type and one of or a combination of following collision determination information: content carried by a downlink signal or channel, first indication information, second indication information, third indication information; wherein the DL PRS type is aperiodic positioning reference signal or semi-persistent positioning reference signal, the first indication information indicates whether a positioning QoS requirement is high precision and/or low latency, the second indication information is used for indicating priority levels of downlink signals or channels, and the third indication information is used for indicating priority levels of the first indication information and the second indication information 102 — choosing, by the user equipment, according to the DL PRS type and the collision determination information, to discard a DL PRS or discard other downlink signals or channels in an OFDM symbol where a collision occurs

Fig. 1

201 — sending, by a base station, one of or a combination of following information to UE: first indication information, second indication information, third indication information; wherein the first indication information indicates whether a positioning latency requirement is high precision and/or low latency, the second indication information is used for indicating priority levels of downlink signals or channels, and the third indication information is used for indicating priority levels of the first indication information and the second indication information 202 — sending, by the base station, a DL PRS to the UE

Fig. 2

301 — determining, by an LMF, LPP signalling carrying one of or a combination of following information: first indication information, second indication information, third indication information; wherein the first indication information indicates whether a positioning latency requirement is high precision and/or low latency, the second indication information is used for indicating priority levels of downlink signals or channels, and the third indication information is used for indicating priority levels of the first indication information and the second indication information 302 — sending, by the LMF, the LPP signalling to UE directly or to the UE through a base station

COLLISION PROCESSING AND INDICATION METHOD, DEVICE, APPARATUS, AND MEDIUM

CROSS-REFERENCE TO RELATED APPLICATIONS

The present application is a U.S. national phase application of a PCT Application No. PCT/CN2021/087199 filed on Apr. 14, 2021, which claims a priority to the Chinese patent application No. 202010397426.0 filed in China on May 12, 2020, the disclosures of which are incorporated herein by reference in their entireties.

TECHNICAL FIELD

The present disclosure relates to the field of wireless communication technology, in particular to a collision processing method, an indication method, a device, an apparatus, and a medium.

BACKGROUND

The 3rd Generation Partnership Project (3GPP) New Radio (NR) defines the solution for processing the collision occurring between a periodic downlink positioning reference signal (DL PRS) and a synchronization signal (SS) and physical broadcast channel (PBCH) block (SSB) of the current cell/neighboring cell. The solution is mainly as follows:
  for the serving transmission and reception point (TRP), the user equipment (UE) assumes that the DL PRS is not mapped to any orthogonal frequency division multiplexing (OFDM) symbol containing SSB (i.e., the downlink PRS in these symbols is punctured);
  for the neighboring TRP, when receiving from the network the positioning assistance data containing SSB configuration information, the UE assumes that the PRS is not mapped to OFDM symbols occupied by SSB transmission (i.e., the downlink PRS in these symbols is punctured).

Since NR does not support aperiodic/semi-persistent PRS, a processing solution for a collision occurring between an aperiodic/semi-persistent PRS and other downlink signals/channels is not defined in the related art.

That is, a disadvantage of the related art is that, since NR does not support aperiodic/semi-persistent PRS, a processing solution for a collision occurring between an aperiodic/semi-persistent PRS and other downlink signals/channels is not defined yet.

SUMMARY

The present disclosure provides a collision processing method, an indication method, a device, an apparatus, and a medium, to solve the problem of collision between aperiodic/semi-persistent PRS and other downlink signals/channels.

An embodiment of the present disclosure provides a collision processing method, which solves how to process the colliding DL PRS or other downlink signals or channels when a collision occurs, including:
  obtaining, by UE, a DL PRS type and collision determination information, the collision determination information being one of or a combination of following information: content carried by a downlink signal or channel, first indication information, second indication information, third indication information; wherein the DL PRS type is aperiodic PRS or semi-persistent PRS, the first indication information is used for indicating a positioning latency requirement, the second indication information is used for indicating priority levels of downlink signals or channels, and the third indication information is used for indicating priority levels of the first indication information and the second indication information;
  choosing, by the UE, according to the DL PRS type and the collision determination information, to discard a DL PRS or discard other downlink signals or channels in an OFDM symbol where a collision occurs.

Optionally, the downlink signal or channel in the collision determination information includes one of or a combination of following signals or channels: an SSB, a PDCCH, a PDSCH.

Optionally, the other downlink signals or channels discarded include one of following signals or channels: an SSB, a PDCCH, a PDSCH, a CSI-RS, and a PT-RS.

Optionally, the first indication information, the second indication information or the third indication information is indicated by one of or a combination of following signalling:
  LPP signalling, RRC signalling, MAC-CE signalling or DCI signalling.

Optionally, the method further includes:
  updating, according to the received MAC-CE or DCI signalling, configuration of the received LPP signalling or RRC signalling.

Optionally, the priority levels in the second indication message or the third indication message are predefined by protocol or configured through signaling.

Optionally, in case of choosing to discard the other downlink signals or channels, the method further includes:
  receiving and measuring, by the UE, a valid DL PRS to obtain a positioning measurement result.

Optionally, the method further includes:
  reporting, by the UE, the positioning measurement result to a network; or
  performing, by the UE, a positioning calculation according to the positioning measurement result.

An embodiment of the present disclosure provides an indication method, which solves the problem of providing the basis for the UE to process a colliding DL PRS or other downlink signals or channels when a collision occurs, including:
  sending, by a base station, one of or a combination of following information to UE: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;
  sending, by the base station, a DL PRS to the UE.

Optionally, the first indication information, the second indication information or the third indication information is sent through one of or a combination of following signalling:
  LPP signalling, RRC signalling, MAC-CE signalling or DCI signalling.

Optionally, configuration of the LPP signalling or the RRC signalling is updated through the MAC-CE signalling or the DCI signalling.

Optionally, the priority levels in the second indication message or the third indication message are predefined by protocol or configured through signaling.

Optionally, the method further includes:
forwarding, by the base station, to an LMF, a positioning measurement result reported by the UE to a network.

Optionally, the method further includes:
forwarding, by the base station, to the UE, LPP signalling sent by an LMF, wherein the LPP signalling includes one of or a combination of following information: the first indication information, the second indication information, and the third indication information.

An embodiment of the present disclosure provides an indication method, which solves the problem of providing the basis for the UE to process a colliding DL PRS or other downlink signals or channels when a collision occurs, including:

determining, by an LMF, LPP signalling including one of or a combination of following information: first indication information, second indication information, and third indication information; wherein the first indication information is used for indicating a positioning latency requirement, the second indication information is used for indicating priority levels of downlink signals or channels, and the third indication information is used for indicating priority levels of the first indication information and the second indication information;

sending, by the LMF, the LPP signalling to UE directly or to the UE through a base station.

Optionally, the method further includes:
receiving, by the LMF, a positioning measurement result reported by the UE and forwarded by the base station, and performing a UE position calculation.

An embodiment of the present disclosure provides UE, including:

a processor, configured to read a program in a memory to implement the following process:

obtaining a DL PRS type and collision determination information, the collision determination information being one of or a combination of following information: content carried by a downlink signal or channel, first indication information, second indication information, third indication information; wherein the DL PRS type is aperiodic PRS or semi-persistent PRS, the first indication information is used for indicating a positioning latency requirement, the second indication information is used for indicating priority levels of downlink signals or channels, and the third indication information is used for indicating priority levels of the first indication information and the second indication information;

choosing, according to the DL PRS type and the collision determination information, to discard a DL PRS or discard other downlink signals or channels in an OFDM symbol where a collision occurs;

a transceiver, configured to receive and send data under the control of the processor.

Optionally, the downlink signal or channel in the collision determination information includes one of or a combination of following signals or channels: an SSB, a PDCCH, a PDSCH.

Optionally, the other downlink signals or channels discarded include one of following signals or channels: an SSB, a PDCCH, a PDSCH, a CSI-RS, a PT-RS.

Optionally, the first indication information, the second indication information or the third indication information is indicated by one of or a combination of following signalling:

LPP signalling, RRC signalling, MAC-CE signalling or DCI signalling.

Optionally, the processor is configured to read the program in the memory to further implement:
updating, according to the received MAC-CE or DCI signalling, configuration of the received LPP signalling or RRC signalling.

Optionally, the priority levels in the second indication message or the third indication message are predefined by protocol or configured through signaling.

Optionally, in case of choosing to discard the other downlink signals or channels, the processor is configured to read the program in the memory to further implement:
receiving and measuring a valid DL PRS to obtain a positioning measurement result.

Optionally, the processor is configured to read the program in the memory to further implement:
reporting the positioning measurement result to a network; or
performing a positioning calculation according to the positioning measurement result.

An embodiment of the present disclosure provides a base station, including:

a processor, configured to read a program in a memory to implement following process:

sending, to UE, one of or a combination of following information: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

sending a DL PRS to the UE;

a transceiver, configured to receive and send data under the control of the processor.

Optionally, the first indication information, the second indication information or the third indication information is sent through one of or a combination of following signalling:

LPP signalling, RRC signalling, MAC-CE signalling or DCI signalling.

Optionally, configuration of the LPP signalling or the RRC signalling is updated by the MAC-CE signalling or the DCI signalling.

Optionally, the priority levels in the second indication message or the third indication message are predefined by protocol or configured through signaling.

Optionally, the processor is configured to read the program in the memory to further implement:
forwarding, to an LMF, a positioning measurement result reported by the UE to a network.

Optionally, the processor is configured to read the program in the memory to further implement:
forwarding, to the UE, LPP signalling sent by an LMF, wherein the LPP signalling includes one of or a combination of following information: the first indication information, the second indication information, and the third indication information.

An embodiment of the present disclosure provides an LMF, including:

a processor, configured to read a program in a memory to implement following process:

determining LPP signalling including one of or a combination of following information: first indication information, second indication information, and third indication information; wherein the first indication information is used for indicating a positioning latency requirement, the second indication information is used for indicating priority levels of downlink signals or channels, and the third indication information is used for indicating priority levels of the first indication information and the second indication information;

sending the LPP signalling to UE directly or to the UE through a base station;

a transceiver, configured to receive and send data under the control of the processor.

Optionally, the processor is configured to read the program in the memory to further implement:

receiving a positioning measurement result reported by the UE and forwarded by the base station, and performing a UE position calculation.

An embodiment of the present disclosure provides a collision processing apparatus, including:

an obtaining module, configured to obtain a DL PRS type and collision determination information, the collision determination information being one of or a combination of following information: content carried by a downlink signal or channel, first indication information, and second indication information, and third indication information; wherein the DL PRS type is aperiodic PRS or semi-persistent PRS, the first indication information is used for indicating a positioning latency requirement, the second indication information is used for indicating priority levels of downlink signals or channels, and the third indication information is used for indicating priority levels of the first indication information and the second indication information;

a choosing module, configured to choose, according to the DL PRS type and the collision determination information, to discard a DL PRS or discard other downlink signals or channels in an OFDM symbol where a collision occurs.

An embodiment of the present disclosure provides an indication apparatus, including:

a first sending module, configured to send one of or a combination of following information to UE: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

a second sending module, configured to send a DL PRS to the UE.

An embodiment of the present disclosure provides an indication apparatus, including:

a determination module, configured to determine LPP signalling including one of or a combination of following information: first indication information, second indication information, and third indication information; wherein the first indication information is used for indicating a positioning latency requirement, the second indication information is used for indicating priority levels of downlink signals or channels, and the third indication information is used for indicating priority levels of the first indication information and the second indication information;

a LMF sending module, configured to send the LPP signalling to UE directly or to the UE through a base station.

An embodiment of the present disclosure provides a computer-readable storage medium, wherein the computer-readable storage medium stores a computer program configured to implement the aforementioned collision processing method and/or indication method.

The beneficial effects of the present disclosure are as follows.

In the technical solution provided by the embodiment of the present disclosure, the UE will obtain information for determining the priority of the DL PRS relative to other downlink signals or channels, so that when a collision occurs, the UE can choose to discard the DL PRS or discard other downlink signals or channels. Since the problem of collision between OFDM symbol occupied by aperiodic/semi-persistent PRS and OFDM symbol occupied by other downlink signals/channels is solved, different collision processing methods can be flexibly selected in high-precision and low-latency positioning scenarios, thereby improving positioning accuracy and reducing positioning latency.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an undue limitation on the present disclosure.

FIG. 1 is a schematic flowchart of a collision processing method on the UE side according to an embodiment of the present disclosure;

FIG. 2 is a schematic flowchart of an indication method on the base station side according to an embodiment of the present disclosure;

FIG. 3 is a schematic flowchart of an indication method on the LMF side according to an embodiment of the present disclosure;

DETAILED DESCRIPTION

During research, the following is noticed.

Since NR does not support aperiodic/semi-persistent PRS, a processing solution for a collision occurring between an aperiodic/semi-persistent PRS and other downlink signals/channels is not yet defined. 3GPP may support aperiodic/semi-persistent downlink PRS in the NR standard. At this time, if a collision actually occurs, it will affect both positioning accuracy and demodulation performance. Therefore, it is necessary to introduce a collision processing method so as to balance the data communication demodulation performance and positioning performance of the NR system.

A possible solution is that the network avoids, based on a predefined or configured priority, collision between downlink unicast signals/channels and aperiodic/semi-persistent DL PRS when scheduling the downlink unicast signals/channels. For example, DL PRS and other downlink signals/channels are configured to be orthogonally multiplexed in time division multiplexing (TDM) or frequency division multiplexing (FDM) mode, to avoid collisions.

This solution can ensure that the UE side will not encounter the collision between DL PRS and other downlink signals/channels. However, the disadvantage of this solution is: it can only be applied to scheduled downlink signals/channels, which increases the complexity of network scheduling; it cannot be applied to downlink broadcast signals/channels, e.g., SSB (including cell-defined SSB, non-cell-defined SSB), periodic PRS, CORESET #0 (control resource set #0) (i.e., remaining minimum system information (RMSI)), physical downlink shared channel (PDSCH) scheduled by physical downlink control channel (PDCCH) scrambled with system information-radio network temporary identity (SI-RNTI) and paging-radio network temporary identity (P-RNTI), channel state information reference signal (CSI-RS), and phase-tracking reference signal (PT-RS), etc.

Since NR does not support aperiodic/semi-persistent DL PRS, NR does not define a processing solution for collision occurring between aperiodic/semi-persistent PRS and all downlink signals/channels. 3GPP may support aperiodic/semi-persistent downlink PRS in the NR standard. Based on this, an embodiment of the present disclosure proposes a processing solution for collision between OFDM symbol occupied by aperiodic/semi-persistent DL PRS and OFDM symbol occupied by other downlink signals/channels. In the solution, the UE chooses, based on at least one of following information: DL PRS type, content carried by SSB, PDCCH or PDSCH, the first indication information, the second indication information or the third indication information, to discard DL PRS or discard other downlink broadcast signals/channels (including SSB, PDCCH, PDSCH, CSI-RS, PT-RS, etc.) in the OFDM symbol where the collision occurs. In this way, different collision processing methods can be flexibly selected in the high-precision and low-latency positioning scenarios, so as to improve the positioning accuracy and reduce the positioning latency. The specific implementations of the present disclosure will be described below with reference to the accompanying drawings.

In the description process, the implementations on the UE side, base station side and location management function (LMF) side will be described respectively, and then an example of their combined implementation will be given to better understand the implementation of the solution in the embodiments of the present disclosure. This description method does not mean that they must be implemented together or separately. In fact, when they are implemented separately, they also solve the problems on the respective sides, and when they are used in combination, better technical effects will be achieved.

A. Implementation on the UE side.

FIG. 1 is a schematic flowchart of the collision processing method on the UE side. As shown in the figure, the method may include:

step 101: obtaining, by UE, a DL PRS type and collision determination information, the collision determination information being one of or a combination of following information: content carried by a downlink signal or channel, first indication information, second indication information, third indication information; wherein the DL PRS type is aperiodic PRS or semi-persistent PRS, the first indication information is used for indicating a positioning latency requirement, the second indication information is used for indicating priority levels of downlink signals or channels, and the third indication information is used for indicating priority levels of the first indication information and the second indication information;

step 102: choosing, by the UE, according to the DL PRS type and the collision determination information, to discard a DL PRS or discard other downlink signals or channels in an OFDM symbol where a collision occurs.

Specifically, the positioning latency requirement indicated by the first indication information may be, e.g., whether it is high precision and/or whether it is low latency.

Optionally, the downlink signal or channel in the collision determination information includes one of or a combination of following signals or channels: an SSB, a PDCCH, a PDSCH.

Optionally, the other downlink signals or channels discarded include one of following signals or channels: an SSB, a PDCCH, a PDSCH, a CSI-RS, and a PT-RS.

Optionally, the first indication information, the second indication information or the third indication information is indicated by one of or a combination of following signalling: LPP signalling, RRC signalling, MAC-CE signalling or DCI signalling.

Optionally, configuration of the LPP signalling or the RRC signalling is updated by the MAC-CE or the DCI signalling.

Optionally, the priority levels in the second indication message or the third indication message are predefined by protocol or configured through signaling.

Optionally, in case of choosing to discard the other downlink signals or channels, the method further includes: receiving and measuring, by the UE, a valid DL PRS to obtain a positioning measurement result.

Optionally, the method further includes:
reporting, by the UE, the positioning measurement result to a network; or
performing, by the UE, a positioning calculation according to the positioning measurement result.

Specifically, the UE side can implement the following process.

1. The UE obtains, according to a criterion predefined in a protocol or according to configuration of signalling, information such as a DL PRS type, content carried by SSB, PDCCH or PDSCH, first indication information, second indication information or third indication information.

The DL PRS type may include aperiodic PRS and semi-persistent PRS; the first indication information is used for indicating a positioning quality of service (QoS) requirement, for example, at least one of a low latency requirement, a high precision requirement or a high reliability requirement; the second indication information is used for indicating priority levels of downlink signals/channels, and the third indication information is used for indicating priority levels of the first indication information and the second indication information The above three kinds of indication information can be notified to the UE through various signalling. These signalling can be Long Term Evolution positioning protocol (LPP) signalling, radio resource control (RRC) signalling, media access control control element (MAC CE) signalling or downlink control information (DCI) signalling. The configuration of previous LPP signalling or RRC signalling can be updated by MAC-CE signalling or DCI signalling.

The priority levels in the second indication information and the third indication information may be predefined in a protocol, or may be configured by signalling.

2. The UE chooses, according to at least one of following obtained information: DL PRS type, content carried by SSB, PDCCH or PDSCH, first indication information, second indication information or third indication information, etc., to discard the DL PRS or discard other downlink signal/channel in the OFDM symbol where a collision occurs. The other downlink signal/channel includes SSB, PDCCH, PDSCH, CSI-RS, PT-RS, etc.

3. The UE receives and measures a valid DL PRS to obtain a positioning measurement result.

Specifically, the UE receives and measures the DL PRS on a DL PRS resource determined to be valid, to obtain the positioning measurement result.

4. The UE reports the positioning measurement result to the network, or the UE performs positioning calculation by itself.

B. Implementation on a network side base station.

FIG. 2 is a schematic flowchart of an indication method on the base station side. As shown in the figure, the method may include:

step 201: sending, by the base station, one of or a combination of following information to UE: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

step 202: sending, by the base station, a DL PRS to the UE.

Specifically, the positioning latency requirement indicated by the first indication information may be: whether it is high precision and/or whether it is low latency.

Optionally, the first indication information, the second indication information or the third indication information is sent through one of or a combination of following signalling:

LPP signalling, RRC signalling, MAC-CE signalling or DCI signalling.

Optionally, configuration of the LPP signalling or the RRC signalling is updated through the MAC-CE signalling or the DCI signalling.

Optionally, the priority levels in the second indication message or the third indication message are predefined by protocol or configured through signaling.

Optionally, the method further includes:
forwarding, by the base station, to an LMF, a positioning measurement result reported by the UE to a network.

Optionally, the method further includes:
forwarding, by the base station, to the UE, LPP signalling sent by an LMF, wherein the LPP signalling includes one of or a combination of following: the first indication information, the second indication information, the third indication information.

Specifically, the base station side can implement the following process.

1. Send RRC signalling, MAC-CE signalling or DCI signalling carrying the three kinds of indication information to UE in a cell, or forward LPP signalling coming from LMF and carrying the three kinds of indication information.

2. Send a DL PRS to the UE in the cell.

3. Receive a positioning measurement result reported by the UE, and forward it to the LMF.

C. Implementation on a network side LMF.

FIG. 3 is a schematic flowchart of an indication method on the LMF side. As shown in the figure, it may include:

step 301: determining, by the LMF, LPP signalling including one of or a combination of following information: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

step 302: sending, by the LMF, the LPP signalling to UE directly or to the UE through a base station.

Specifically, the positioning latency requirement indicated by the first indication information may be, e.g., whether it is high precision and/or whether it is low latency.

Optionally, the method further includes:
receiving, by the LMF, a positioning measurement result reported by the UE and forwarded by the base station, and performing a UE position calculation.

Specifically, the LMF can implement the following process.

1. Send LPP signalling carrying three kinds of indication information to all UEs, or send LPP signalling carrying three kinds of indication information to a base station, and the base station forwards it to UE.

2. Receive a positioning measurement result forwarded by the base station, and perform the UE position calculation based on the positioning measurement result in combination with information such as TRP position.

Examples are given below.

Embodiment 1

In this embodiment, the UE performs processing based on the DL PRS type and the first indication information.

UE side:

1. The UE obtains information such as the DL PRS type, the content carried by the SSB, the PDCCH or the PDSCH, and the first indication information according to the criterion predefined in the protocol or the configuration of signalling. The DL PRS types include aperiodic PRS and semi-persistent PRS; the first indication information is used for indicating a positioning QoS requirement, e.g., at least one of: a low-latency requirement, a high-precision requirement, or a high-reliability requirement.

The above-mentioned first indication information may be notified to the UE through various signalling. These signalling may be LPP signalling, RRC signalling, MAC-CE signalling or DCI signalling, and the MAC-CE or DCI signalling may further update the configuration of previous LPP signalling or RRC signalling.

2. The UE chooses, according to the obtained DL PRS type, the content carried by SSB, PDCCH or PDSCH and the first indication information, to discard the DL PRS or discard the SSB or PDCCH or PDSCH in an OFDM symbol where a collision occurs.

At this time, the following three cases may be processed independently.

1) The DL PRS type is aperiodic PRS or semi-persistent PRS, and the first indication information is used for indicating that the positioning latency requirement is low latency, then the priority level of aperiodic PRS or semi-persistent PRS is lower than that of cell defined SSB (which contains indication information for remaining minimum SI (RMSI)), and is higher than priority levels of downlink signals/channels other than the cell defined SSB, e.g., non-cell defined SSB or PDCCH or PDSCH. At this time, the UE retains an aperiodic PRS or semi-persistent PRS in the OFDM symbol where a collision occurs.

2) The DL PRS type is aperiodic PRS, and the first indication information is used for indicating that the positioning latency requirement is non-low latency, then the priority level of aperiodic PRS is lower than that of SSB, and higher than those of other downlink signals/channels, e.g., PDCCH or PDSCH; at this time, when the downlink signal/channel is SSB, the UE discards aperiodic PRS or semi-persistent PRS in the OFDM symbol where a collision occurs; when the downlink signal/channel is other downlink signals/channels, e.g., PDCCH or PDSCH, the UE retains the aperiodic PRS or semi-persistent PRS in the OFDM symbol where a collision occurs.

3) The DL PRS type is semi-persistent PRS, and the first indication information is used for indicating that the positioning latency requirement is non-low latency, then the priority level of semi-persistent PRS is lower than those of all other downlink signals/channels, i.e., SSB or PDCCH or PDSCH. At this time, the UE discards the aperiodic PRS or the semi-persistent PRS in the OFDM symbol where a collision occurs.

3. The UE receives and measures a valid DL PRS to obtain a positioning measurement result.

Specifically, the UE receives a DL PRS on a DL PRS resource determined to be valid, and measures the DL PRS to obtain the positioning measurement result.

4. The UE reports the positioning measurement result to the network, or the UE performs positioning calculation by itself.

Network Side—Base Station.

1. Send the RRC signalling carrying the first indication information to UE in a cell, or forward the LPP signalling coming from the LMF and carrying the first indication information, or send the first indication information to the UE through MAC-CE signalling or DCI signalling.

2. Send the DL PRS to the UE in the cell.

3. Receive a positioning measurement result reported by the UE, and forward it to the LMF.

Network Side—LMF.

1. Send the LPP signalling carrying the first indication information to all UEs, or send the LPP signalling carrying the first indication information to the base station, and the base station forwards it to UE.

2. Receive a positioning measurement result reported by the UE and forwarded by the base station, and perform the UE position calculation based on the positioning measurement result in combination with information such as TRP position.

Embodiment 2

In this embodiment, the UE performs processing based on the DL PRS type and the second indication information.
UE Side:

1. The UE obtains information such as the DL PRS type, the content carried by SSB, PDCCH or PDSCH, and the second indication information according to the criterion predefined in the protocol or the configuration of signalling. The DL PRS type includes aperiodic PRS and semi-persistent PRS; the second indication information is used for indicating priority levels of downlink signals/channels, and the third indication information is used for indicating priority levels of the first indication information and the second indication information.

The signalling carrying the above three kinds of indication information can be LPP signalling, RRC signalling, MAC-CE signalling or DCI signalling, and the MAC-CE or DCI signalling may update the configuration of previous LPP signalling or RRC signalling.

The priority levels in the second indication information may be predefined by the protocol, or may be configured by signalling.

2. UE chooses, according to the obtained DL PRS type, the content carried by SSB, PDCCH or PDSCH, and the second indication information, to discard the DL PRS, or discard the SSB or PDCCH or PDSCH in the OFDM symbol where a collision occurs. The specific implementation is described later.

3. The UE receives and measures a valid DL PRS to obtain the positioning measurement result.

Specifically, the UE receives and measures the DL PRS on a DL PRS resource determined to be valid, to obtain the positioning measurement result.

4. The UE reports the positioning measurement result to the network, or the UE performs positioning calculation by itself.

A schematic illustration of at least two feasible priority level lists in the second indication information is given below.

Example 1

The first predefined priority level list is as follows (the basic idea is that the broadcast signal/channel has the highest priority level):

first priority level: downlink broadcast signal/channel type 1, that is, SSB (the SSB here includes SSB of the serving cell and SSB of a neighboring cell notified in a positioning configuration message);

second priority level: downlink broadcast signal/channel type 2, that is, periodic PRS, CORESET #0 (i.e., RMSI), PDSCH scheduled by PDCCH scrambled with SI-RNTI and P-RNTI;

third priority level: downlink unicast signal/channel type 1, that is, aperiodic PRS;

fourth priority level: downlink unicast signal/channel type 2, that is, semi-persistent PRS;

fifth priority level: downlink unicast signal/channel type 3, that is, other CORESETs than CORESET #0, PDSCH scheduled by PDCCH scrambled with RA-RNTI, PDSCH scheduled by PDCCH scrambled with C-RNTI, CSI-RS and PT-RS, etc.

The collision processing solutions according to the above priority levels are shown in table 1 and table 2.

TABLE 1

| Target PRS Type | Downlink signal/channel where a collision occurs | Processing solutions in the event of a collision |
|---|---|---|
| Aperiodic PRS | Downlink broadcast signal/channel type 1-SSB | Discard aperiodic PRS in the OFDM symbol where the collision occurs |
| Aperiodic PRS | Downlink broadcast signal/channel type 2-periodic PRS, CORESET #0 (i.e., RMSI), PDSCH scheduled by PDCCH scrambled with SI-RNTI and P-RNTI | Discard aperiodic PRS in the OFDM symbol where the collision occurs |

TABLE 1-continued

| | | |
|---|---|---|
| Aperiodic PRS | Downlink unicast signal/channel type 2-semi-persistent PRS | Discard semi-persistent PRS in the OFDM symbol where the collision occurs |
| Aperiodic PRS | Downlink unicast signal/channel type 3-other CORESETs than CORESET #0, PDSCH scheduled by PDCCH scrambled with RA-RNTI, PDSCH scheduled by PDCCH scrambled with C-RNTI, CSI-RS and PT-RS, etc. | Retain semi-persistent PRS in the OFDM symbol where the collision occurs |

TABLE 2

| Target PRS Type | Downlink signal/channel where a collision occurs | Processing solutions in the event of a collision |
|---|---|---|
| Semi-persistent PRS | Downlink broadcast signal/channel type 1-SSB | Discard semi-persistent PRS in the OFDM symbol where the collision occurs |
| Semi-persistent PRS | Downlink broadcast signal/channel type 2-periodic PRS, CORESET #0 (i.e., RMSI), PDSCH scheduled by PDCCH scrambled with SI-RNTI and P-RNTI | Discard semi-persistent PRS in the OFDM symbol where the collision occurs |
| Semi-persistent PRS | Downlink unicast signal/channel type 1-aperiodic PRS | Discard semi-persistent PRS in the OFDM symbol where the collision occurs |
| Semi-persistent PRS | Downlink unicast signal/channel type 3-other CORESETs than CORESET #0, PDSCH scheduled by PDCCH scrambled with RA-RNTI, PDSCH scheduled by PDCCH scrambled with C-RNTI, CSI-RS and PT-RS, etc. | Retain semi-persistent PRS in the OFDM symbol where the collision occurs |

Example 2

The second predefined priority level list is as follows (the basic idea is that SSB has the highest priority level):

first priority level: downlink broadcast signal/channel type 1, SSB (the SSB here includes SSB of the serving cell and SSB of a neighboring cell notified in a positioning configuration message);

second priority level: downlink unicast signal/channel type 1, aperiodic PRS;

third priority level: downlink unicast signal/channel type 2, semi-persistent PRS;

fourth priority level: downlink broadcast signal/channel type 2, periodic PRS, CORESET #0 (i.e., RMSI), PDSCH scheduled by PDCCH scrambled with SI-RNTI and P-RNTI;

fifth priority level: downlink unicast signal/channel type 3, other CORESETs than CORESET #0, PDSCH scheduled by PDCCH scrambled with RA-RNTI, PDSCH scheduled by PDCCH scrambled with C-RNTI, CSI-RS and PT-RS, etc.

The collision processing solutions according to the above priority levels are shown in table 3 and table 4.

TABLE 3

| Target PRS Type | Downlink signal/channel where a collision occurs | Processing solutions in the event of a collision |
|---|---|---|
| Aperiodic PRS | Downlink broadcast signal/channel type 1-SSB | Discard aperiodic PRS in the OFDM symbol where the collision occurs |
| Aperiodic PRS | Downlink broadcast signal/channel type 2-periodic PRS, CORESET #0 (i.e., RMSI), PDSCH scheduled by PDCCH scrambled with SI-RNTI and P-RNTI | Retain aperiodic PRS in the OFDM symbol where the collision occurs |
| Aperiodic PRS | Downlink unicast signal/channel type 2-semi-persistent PRS | Retain aperiodic PRS in the OFDM symbol where the collision occurs |
| Aperiodic PRS | Downlink unicast signal/channel type 3-other CORESETs than CORESET #0, PDSCH scheduled by PDCCH scrambled with RA-RNTI, PDSCH scheduled by PDCCH scrambled with C-RNTI, CSI-RS and PT-RS, etc. | Retain aperiodic PRS in the OFDM symbol where the collision occurs |

TABLE 4

| Target PRS Type | Downlink signal/channel where a collision occurs | Processing solutions in the event of a collision |
|---|---|---|
| Semi-persistent PRS | Downlink broadcast signal/channel type 1-SSB | Discard semi-persistent PRS in the OFDM symbol where the collision occurs |
| Semi-persistent PRS | Downlink broadcast signal/channel type 2-periodic PRS, CORESET #0 (i.e., RMSI), PDSCH scheduled by PDCCH scrambled with SI-RNTI and P-RNTI | Retain semi-persistent PRS in the OFDM symbol where the collision occurs |
| Semi-persistent PRS | Downlink unicast signal/channel type 1-aperiodic PRS | Discard semi-persistent PRS in the OFDM symbol where the collision occurs |
| Semi-persistent PRS | Downlink unicast signal/channel type 3-other CORESETs than CORESET #0, PDSCH scheduled by PDCCH scrambled with RA-RNTI, PDSCH scheduled by PDCCH scrambled with C-RNTI, CSI-RS and PT-RS, etc. | Retain semi-persistent PRS in the OFDM symbol where the collision occurs |

Network Side—Base Station:

1. Send the RRC signalling carrying the first indication information to the UE in the cell, or forward the LPP signalling coming from the LMF and carrying the second indication information, or send the first indication information to the UE through MAC-CE signalling or DCI signalling.

2. Send the DL PRS to the UE in the cell.

3. Receive the positioning measurement result reported by the UE, and forward it to the LMF.

Network Side—LMF:

1. Send the LPP signalling carrying the second indication information to all UEs, or send the LPP signalling carrying the second indication information to the base station, which is forwarded by the base station to the UE.

2. Receive the positioning measurement result reported by the UE and forwarded by the base station, and perform the UE position calculation based on the positioning measurement result in combination with information such as TRP position.

Embodiment 3

In this embodiment, the UE performs processing based on the DL PRS type, the first indication information, the second indication information and the third indication information.

UE Side:

1. The UE obtains information such as DL PRS type, content carried by SSB, PDCCH or PDSCH, first indication information, second indication information or third indication information according to the criterion predefined in the protocol or the configuration of signalling. The DL PRS types include aperiodic PRS and semi-persistent PRS; the first indication information is used for indicating whether the positioning latency requirement is at least one of high precision and low latency; the second indication information is used for indicating priority levels of downlink signals/channels, and the third indication information is used for indicating priority levels of the first indication information and the second indication information.

The signalling carrying the above three kinds of indication information can be LPP signalling, RRC signalling, MAC-CE signalling or DCI signalling, and the MAC-CE or DCI signalling can update the configuration of previous LPP signalling or RRC signalling.

The priority levels in the above second indication information and third indication information may be predefined by the protocol, or may be configured by signalling.

2. The UE chooses, according to at least one piece of information among the DL PRS type, the content carried by the SSB, PDCCH or PDSCH, the first indication information, the second indication information or the third indication information, which is obtained in step 1, to discard the DL PRS, or discard the SSB or PDCCH or PDSCH in the OFDM symbol where a collision occurs.

The third indication information: the priority levels of the first indication information and the second indication information.

For example, the third indication information is 1, then the priority level of the first indication information is higher than that of the second indication information; the third indication information is 0, then the priority level of the first indication information is lower than that of the second indication information.

3. The UE receives and measures a valid DL PRS to obtain the positioning measurement result.

Specifically, the UE receives a DL PRS on a DL PRS resource determined to be valid, and measures the DL PRS to obtain the positioning measurement result.

4. The UE reports the positioning measurement result to the network, or the UE performs positioning calculation by itself.

Network Side—Base Station:

1. Send the RRC signalling carrying three kinds of indication information to the UE in the cell, or forward the LPP signalling coming from the LMF and carrying the three kinds of indication information, or send the first indication information to the UE through MAC-CE signalling or DCI signalling.

2. Send the DL PRS to the UE in the cell.

3. Receive the positioning measurement result reported by the UE, and forward it to the LMF.

Network Side—LMF:

1. Send LPP signalling carrying three kinds of indication information to all UEs, or send LPP signalling carrying three kinds of indication information to the base station, and the base station forwards it to the UE.

2. Receive the positioning measurement result reported by the UE and forwarded by the base station, and perform the UE position calculation based on the positioning measurement result in combination with the information such as TRP position.

Based on the same inventive concept, the embodiments of the present disclosure also provide a base station side device, user equipment, an LMF, a collision processing apparatus, and an indication apparatus. Since the problem-solving principle of these devices is similar to the collision processing method and the indication method, for the implementations of these devices, references may be made to the implementations of the method, which will not be repeated.

When implementing the technical solutions provided by the embodiments of the present disclosure, it can be implemented as follows.

Figure 4:
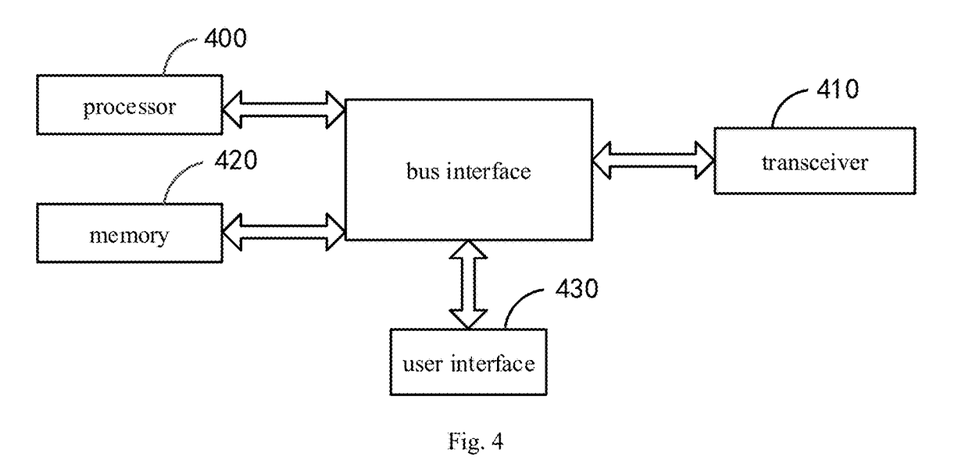
FIG. 4 is a schematic structural diagram of UE according to an embodiment of the present disclosure.

FIG. 4 is a schematic structural diagram of UE. As shown in the figure, the user equipment includes:

a processor 400, configured to read a program in a memory 420, to implement the following process:

obtaining a DL PRS type and collision determination information, the collision determination information being one of or a combination of following information: content carried by a downlink signal or channel, first indication information, second indication information, third indication information; wherein the DL PRS type is aperiodic PRS or semi-persistent PRS, the first indication information is used for indicating a positioning latency requirement, the second indication information is used for indicating priority levels of downlink signals or channels, and the third indication information is used for indicating priority levels of the first indication information and the second indication information;

choosing, according to the DL PRS type and the collision determination information, to discard a DL PRS or discard other downlink signals or channels in an OFDM symbol where a collision occurs;

a transceiver 410, configured to receive and send data under the control of the processor 400.

Optionally, the downlink signal or channel in the collision determination information includes one of or a combination of following signals or channels: an SSB, a PDCCH, a PDSCH.

Optionally, the other downlink signals or channels discarded include one of following signals or channels: an SSB, a PDCCH, a PDSCH, a CSI-RS, a PT-RS.

Optionally, the first indication information, the second indication information or the third indication information is indicated by one of or a combination of following signalling: LPP signalling, RRC signalling, MAC-CE signalling or DCI signalling.

Optionally, the processor 400 is configured to read the program to further implement:

updating, according to the received MAC-CE or the DCI signalling, configuration of the received LPP signalling or the RRC signalling.

Optionally, the priority levels in the second indication message or the third indication message are predefined by protocol or configured through signaling.

Optionally, in case of choosing to discard the other downlink signals or channels, the processor 400 is configured to read the program to further implement:

receiving and measuring a valid DL PRS to obtain a positioning measurement result.

Optionally, the processor 400 is configured to read the program to further implement:

reporting the positioning measurement result to a network; or performing a positioning calculation according to the positioning measurement result.

In FIG. 4, the bus architecture may include any number of interconnected buses and bridges, specifically various circuits such as one or more processors represented by the processor 400 and the memory represented by the memory 420 are connected together. The bus architecture can also connect various other circuits such as peripheral devices, voltage regulators, power management circuits, etc., which are all known in the field, and therefore, will not be further described herein. The bus interface provides the interface. The transceiver 410 may be a plurality of elements, that is, including a transmitter and a receiver, and provide a unit for communicating with various other devices on the transmission medium. For different UEs, the user interface 430 may also be an interface capable of connecting externally or internally to a required device. The connected device includes, but is not limited to, a keypad, a display, a speaker, a microphone, a joystick, etc.

The processor 400 is responsible for managing the bus architecture and general processing, and the memory 420 can store data used by the processor 400 when performing operations.

An embodiment of the present disclosure provides a collision processing apparatus, including:

an obtaining module, configured to obtain a DL PRS type and collision determination information, the collision determination information being one of or a combination of following information: content carried by a downlink signal or channel, first indication information, second indication information, third indication information; wherein the DL PRS type is aperiodic PRS or semi-persistent PRS, the first indication information is used for indicating a positioning latency requirement, the second indication information is used for indicating priority levels of downlink signals or channels, and the third indication information is used for indicating priority levels of the first indication information and the second indication information;

a choosing module, configured to choose, according to the DL PRS type and the collision determination information, to discard a DL PRS or discard other downlink signals or channels in an OFDM symbol where a collision occurs.

For details, references may be made to the implementation of the collision processing method on the UE side.

For the convenience of description, each part of the above apparatus is divided into various modules or units by function and described separately. Of course, when implementing the present disclosure, the functions of various modules or units may be implemented in one or more pieces of software or hardware.

When implementing the technical solutions provided by the embodiments of the present disclosure, it can be implemented as follows.

Figure 5:
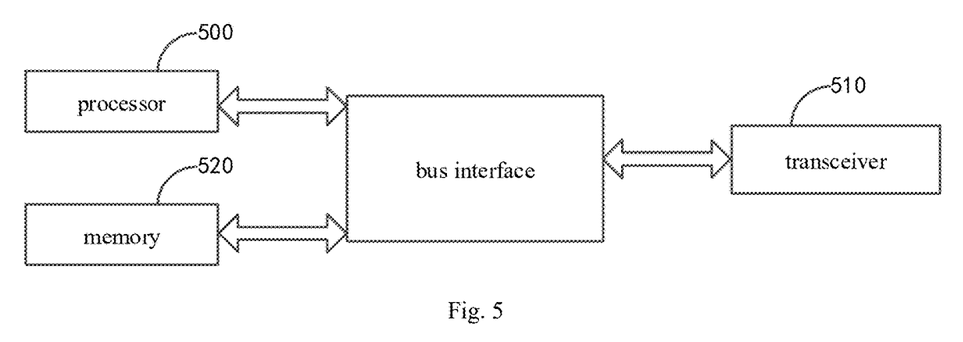
FIG. 5 is a schematic structural diagram of a base station according to an embodiment of the present disclosure.

FIG. 5 is a schematic structural diagram of the base station. As shown in the figure, the base station includes:

a processor 500, configured to read a program in a memory 520 to implement following process:

sending, to UE, one of or a combination of following information to UE: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

sending a DL PRS to the UE;

a transceiver 510, configured to receive and send data under the control of the processor 500.

Optionally, the first indication information, the second indication information or the third indication information is sent through one of or a combination of following signalling:

LPP signalling, RRC signalling, MAC-CE signalling or DCI signalling.

Optionally, configuration of the LPP signalling or the RRC signalling is updated through the MAC-CE signalling or the DCI signalling.

Optionally, the priority levels in the second indication message or the third indication message are predefined by protocol or configured through signaling.

Optionally, the processor 500 is configured to read the program to further implement:

forwarding, to an LMF, a positioning measurement result reported by the UE to a network.

Optionally, the processor 500 is configured to read the program to further implement:

forwarding, to the UE, the LPP signalling sent by an LMF, wherein the LPP signalling includes one of or a combination of following information: the first indication information, the second indication information, the third indication information.

In FIG. 5, the bus architecture may include any number of interconnected buses and bridges, specifically various circuits such as one or more processors represented by the processor 500 and the memory represented by the memory 520 are connected together. The bus architecture can also connect various other circuits such as peripheral devices, voltage regulators, power management circuits, etc., which are all known in the field, and therefore, will not be further described herein. The bus interface provides the interface. The transceiver 510 may be a plurality of elements, that is, including a transmitter and a receiver, and provide a unit for communicating with various other devices on the transmission medium. The processor 500 is responsible for managing the bus architecture and general processing, and the memory 520 can store data used by the processor 500 when performing operations.

An embodiment of the present disclosure provides an indication apparatus, including:

a first sending module, configured to send one of or a combination of following information to UE: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

a second sending module, configured to send a DL PRS to the UE.

For details, references may be made to the implementation of the indication method on the base station side.

For the convenience of description, each part of the above apparatus is divided into various modules or units by function and described separately. Of course, when implementing the present disclosure, the functions of various modules or units may be implemented in one or more pieces of software or hardware.

When implementing the technical solutions provided by the embodiments of the present disclosure, it can be implemented as follows.

Figure 6:
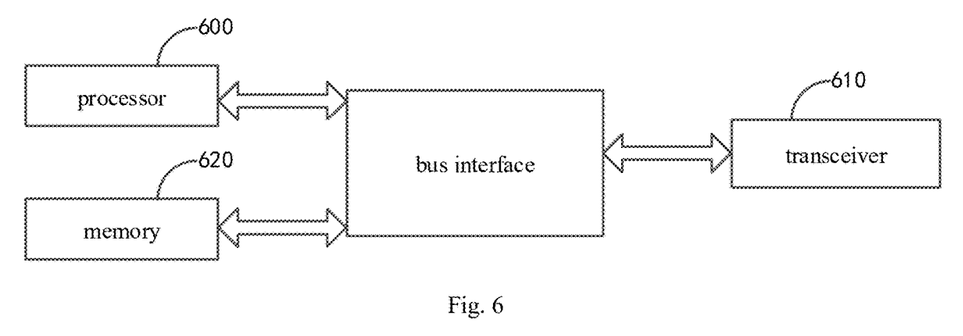
FIG. 6 is a schematic structural diagram of an LMF according to an embodiment of the present disclosure.

FIG. 6 is a schematic structural diagram of an LMF. As shown in the figure, the LMF includes:

a processor 600, configured to read the program in a memory 620, to implement the following process:

determining LPP signalling including one of or a combination of following information: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

sending the LPP signalling to UE directly or to the UE through a base station;

a transceiver 610, configured to receive and send data under the control of the processor 600.

Optionally, the processor 600 is configured to read the program to further implement:

receiving a positioning measurement result reported by the UE and forwarded by the base station, and performing a UE position calculation.

In FIG. 6, the bus architecture may include any number of interconnected buses and bridges, specifically various circuits such as one or more processors represented by the processor 600 and the memory represented by the memory 620 are connected together. The bus architecture can also connect various other circuits such as peripheral devices, voltage regulators, power management circuits, etc., which are all known in the field, and therefore, will not be further described herein. The bus interface provides the interface. The transceiver 610 may be a plurality of elements, that is, including a transmitter and a receiver, and provide a unit for communicating with various other devices on the transmission medium. The processor 600 is responsible for managing the bus architecture and general processing, and the memory 620 can store data used by the processor 600 when performing operations.

An embodiment of the present disclosure provides an indication apparatus, including:

a determination module, configured to determine LPP signalling including one of or a combination of following information: first indication information, second indication information, third indication information; wherein the first indication information is used for indicating a positioning latency requirement, the second indication information is used for indicating priority levels of downlink signals or channels, and the third indication information is used for indicating priority levels of the first indication information and the second indication information;

a LMF sending module, configured to send the LPP signalling to UE directly or to the UE through a base station.

For details, references may be made to the implementation of the indication method on the LMF side.

For the convenience of description, each part of the above apparatus is divided into various modules or units by function and described separately. Of course, when implementing the present disclosure, the functions of various modules or units may be implemented in one or more pieces of software or hardware.

An embodiment of the present disclosure provides a computer-readable storage medium, wherein the computer-readable storage medium stores a computer program configured to implement the foregoing collision processing method and/or indication method.

For details, references may be made to the implementations of the collision processing method on the UE side, the indication method on the base station side, and the indication method on the LMF side.

To sum up, the following technical solutions are mainly provided in the embodiments of the present disclosure:

UE Side:

1. The UE obtains information such as the DL PRS type, the content carried by the SSB, the PDCCH or the PDSCH, the first indication information, the second indication information or the third indication information according to the criteria predefined in the protocol or the configuration of signalling. In step 1, the DL PRS type includes aperiodic PRS and semi-persistent PRS; the first indication information is used for indicating whether the positioning latency requirement is at least one of high precision and low latency; the second indication information is used for indicating priority levels of downlink signals/channels, and the third indication information is used for indicating priority levels of the first indication information and the second indication information.

The signalling carrying the above three kinds of indication information can be LPP signalling, RRC signalling, MAC-CE signalling or DCI signalling, and the MAC-CE or DCI signalling can update configuration of previous LPP signalling or RRC signalling.

The priority levels in the second indication information and third indication information may be predefined by the protocol, or may be configured by signalling.

2. The UE chooses, according to at least one piece of obtained information among the DL PRS type, content carried by SSB, PDCCH or PDSCH, first indication information, second indication information or third indication information, etc., to discard the DL PRS, or discard other downlink signal/channel. The other downlink signal/channel includes SSB, PDCCH, PDSCH, CSI-RS, PT-RS, etc.

Network Side—Base Station:

Send RRC signalling, MAC-CE signalling or DCI signalling carrying three kinds of indication information to the UE in the cell, or forward LPP signalling coming from LMF and carrying the three kinds of indication information.

Network Side—LMF:

Send the LPP signalling carrying three kinds of indication information to all UEs, or send the LPP signalling carrying three kinds of indication information to the base station, and the base station forwards it to the UE.

With this solution, since problem of the collision between the OFDM symbol occupied by aperiodic/semi-persistent PRS and the OFDM symbol occupied by other downlink signals/channels is solved, different collision processing methods can be flexibly selected in high-precision and low-latency positioning scenarios, thereby improving the positioning accuracy and reducing the positioning latency.

A person skilled in the art can understand that embodiments of the present disclosure may be provided as a method, system, or computer program product. Accordingly, the present disclosure may take the form of an entirely hardware embodiment, an entirely software embodiment, or an embodiment combining software and hardware aspects.

Furthermore, the present disclosure may take the form of a computer program product configured to be implemented on one or more computer-usable storage mediums (including but not limited to disk storage, optical storage, etc.) storing computer-usable program codes therein.

The present disclosure is described with reference to flowcharts and/or block diagrams of methods, apparatus (systems), and computer program products according to the embodiments of the disclosure. It will be understood that each process and/or block in the flowcharts and/or block diagrams, and combinations of processes and/or blocks in the flowcharts and/or block diagrams, can be implemented by computer program instructions. These computer program instructions may be provided to the processor of a general-purpose computer, special purpose computer, embedded processor or other programmable data processing device to produce a machine such that the instructions executed by the processor of the computer or other programmable data processing device produce an apparatus for implementing the functions specified in one or more processes in the flowcharts and/or one or more blocks in the block diagrams.

It should be noted that the above division of various modules of the foregoing devices is only a logical division of functions, which can be fully or partially integrated into one physical entity or physically separated when implemented in practice. These modules can be implemented completely in the form of software called by processing elements, or implemented completely in the form of hardware, or implemented partially in the form of software called by processing elements and partially in the form of hardware. For example, the determination module can be a separate processing element or can be integrated in a certain chip of the above-mentioned devices, or it can be stored in the memory of the above-mentioned devices in the form of program codes, which are called by a processing element of the above-mentioned devices to perform the functions of the above-mentioned determination module. Other modules can be implemented similarly. In addition, these modules can be integrated completely or partially, or can be implemented independently. The processing element described here can be an integrated circuit with signal processing capabilities. In the implementation, the steps of the methods, or the modules can be implemented by integrated logic circuits in the hardware of the processor element or by instructions in the form of software.

For example, each module, unit, subunit, or submodule may be one or more integrated circuits configured to implement the above methods, such as: one or more application specific integrated circuits (ASICs), or one or more digital signal processors (DSPs), or one or more field programmable gate arrays (FPGAs), etc. Further, when a module is implemented in the form of program codes called by a processing element, the processing element may be a general-purpose processor, such as a central processing unit (CPU) or other processor that can call program codes. Alternatively, these modules may be integrated together and implemented in the form of a system-on-a-chip (SOC).

The terms "first," "second," etc. in the description and claims of the present disclosure are used to distinguish similar objects and are not necessarily used to describe a specific order or sequence. It should be understood that the data so used may be interchanged under appropriate circumstances so that the embodiments of the disclosure described herein may be implemented in sequences other than those illustrated or described herein. Furthermore, the terms "including" and "having", and any variations thereof, are intended to cover non-exclusive inclusion, for example, a process, method, product or device including a series of steps or units is not necessarily limited to those steps or units clearly listed, but may include those not clearly listed or inherent to the process, method, product, or device. In addition, the specification and claims use "and/or" to denote at least one of the connected objects, e.g., A and/or B and/or C is intended to indicate seven cases including: A alone, B alone, C alone, A and B both, B and C both, A and C both, and all of A, B and C. Similarly, the use of "at least one of A and B" in the specification and claims is to be understood as "A alone, B alone, or A and B both".

These computer program instructions may also be stored in a computer readable memory capable of directing a computer or other programmable data processing device to operate in a particular manner, such that the instructions stored in the computer readable memory produce an article of manufacture including an instruction device that implements the functions specified in one or more processes in a flowchart and/or one or more blocks in a block diagram.

These computer program instructions may also be loaded onto a computer or other programmable data processing device such that a series of operational steps are executed on the computer or other programmable device to produce computer-implemented processing, so that the instructions executed on the computer or other programmable device provide steps for implementing the functions specified in in one or more processes in a flowchart and/or one or more blocks in a block diagram.

It should be pointed out that for a person skilled in the art, several improvements and modifications can be made without departing from the principles of the present disclosure. The present disclosure intends to encompass these improvements and modifications if they fall within the scope of the claims of the present disclosure and equivalents thereof.

What is claimed is:

1. A collision processing method, comprising:
   obtaining, by user equipment (UE), a downlink positioning reference signal (DL PRS) type and collision determination information, the collision determination information being content carried by a downlink signal or channel, and one of or a combination of following information: second indication information, and third indication information; wherein the DL PRS type is aperiodic PRS or semi-persistent PRS, the second indication information is used for indicating priority levels of downlink signals or channels, and the third indication information is used for indicating a priority level of the second indication information;
   choosing, by the UE, according to the DL PRS type and the collision determination information, to discard a DL PRS or discard other downlink signals or channels in an orthogonal frequency division multiplexing (OFDM) symbol where a collision occurs between the aperiodic/semi-persistent PRS and the other downlink signals.

2. The collision processing method according to claim 1, wherein the downlink signal or channel in the collision determination information comprises one of or a combination of following signals or channels: a synchronization signal/physical broadcast channel block (SSB), a physical downlink control channel (PDCCH), a physical downlink shared channel (PDSCH);
   and/or,
   the other downlink signals or channels discarded comprise one of following signals or channels: an SSB, a PDCCH, a PDSCH, a channel state information reference signal (CSI-RS), a phase tracking reference signal (PT-RS).

3. The collision processing method according to claim 1, wherein the second indication information or the third indication information is indicated by one of or a combination of following signalling:
Long Term Evolution positioning protocol (LPP) signalling, radio resource control (RRC) signalling, medium access control-control element (MAC-CE) signalling or downlink control information (DCI) signalling.

4. The collision processing method according to claim 3, further comprising:
updating, according to the received MAC-CE or DCI signalling, configuration of the received LPP signalling or RRC signalling.

5. The collision processing method according to claim 1, wherein in case of choosing to discard the other downlink signals or channels, the method further comprises:
receiving and measuring, by the UE, a valid DL PRS to obtain a positioning measurement result.

6. An indication method, comprising:
sending, by a base station, to a user equipment (UE) i) a downlink positioning reference signal (DL PRS) type comprising aperiodic PRS or semi-persistent PRS, ii) collision determination information, and iii) one of or a combination of following information: second indication information, and third indication information;
wherein the second indication information is used for indicating priority levels of downlink signals or channels, and the third indication information is used for indicating a priority level of the second indication information;
sending, by the base station, a DL PRS to the UE;
wherein the UE receives the DL PRS type and chooses, according to the DL PRS type and the collision determination information, to discard the DL PRS or other downlink signals where a collision occurs between the aperiodic/semi-persistent PRS and the other downlink signals.

7. The indication method according to claim 6, wherein the second indication information or the third indication information is sent through one of or a combination of following signalling:
Long Term Evolution positioning protocol (LPP) signalling, radio resource control (RRC) signalling, medium access control-control element (MAC-CE) signalling or downlink control information (DCI) signalling;
wherein configuration of the LPP signalling or the RRC signalling is updated by the MAC-CE signalling or the DCI signalling.

8. The indication method according to claim 6, further comprising:
forwarding, by the base station, to a location management function (LMF), a positioning measurement result reported by the UE;
and/or,
forwarding, by the base station, to the UE, Long Term Evolution positioning protocol (LPP) signalling sent by a location management function (LMF), wherein the LPP signalling comprises one of or a combination of following information: the second indication information and the third indication information.

9. User equipment (UE), comprising:
a processor, configured to read a program in a memory to implement following steps:
obtaining a downlink positioning reference signal (DL PRS) type and collision determination information, the collision determination information being content carried by a downlink signal or channel, and one of or a combination of following information: second indication information, and third indication information; wherein the DL PRS type is aperiodic PRS or semi-persistent PRS, the second indication information is used for indicating priority levels of downlink signals or channels, and the third indication information is used for indicating a priority level of the second indication information;
choosing, according to the DL PRS type and the collision determination information, to discard a DL PRS or discard other downlink signals or channels in an orthogonal frequency division multiplexing (OFDM) symbol where a collision occurs between the aperiodic/semi-persistent PRS and the other downlink signals;
a transceiver, configured to receive and send data under the control of the processor.

10. The UE according to claim 9, wherein the downlink signal or channel in the collision determination information comprises one of or a combination of following signals or channels: a synchronization signal/physical broadcast channel block (SSB), a physical downlink control channel (PDCCH), a physical downlink shared channel (PDSCH); and/or,
the other downlink signals or channels discarded comprise one of following signals or channels: an SSB, a PDCCH, a PDSCH, a CSI-RS, a PT-RS.

11. The UE according to claim 9, wherein the second indication information or the third indication information is indicated by one of or a combination of following signalling:
Long Term Evolution positioning protocol (LPP) signalling, radio resource control (RRC) signalling, medium access control-control element (MAC-CE) signalling or downlink control information (DCI) signalling.

12. The UE according to claim 11, wherein the processor is configured to read the program in the memory to further implement:
updating, according to the received MAC-CE or DCI signalling, configuration of the received LPP signalling or RRC signalling.

13. The UE according to claim 9, wherein in case of choosing to discard the other downlink signals or channels, the processor is configured to read the program in the memory to further implement:
receiving and measuring a valid DL PRS to obtain a positioning measurement result.

* * * * *